US008656049B2

(12) United States Patent
Fraser et al.

(10) Patent No.: US 8,656,049 B2
(45) Date of Patent: Feb. 18, 2014

(54) CODE INJECTION SYSTEM AND METHOD OF OPERATION

(71) Applicants: Stuart Fraser, Armonk, NY (US); Homero Joshua Garza, East Longmeadow, MA (US); Nicholas Eugenio Huanca, Hartford, CT (US)

(72) Inventors: Stuart Fraser, Armonk, NY (US); Homero Joshua Garza, East Longmeadow, MA (US); Nicholas Eugenio Huanca, Hartford, CT (US)

(73) Assignee: Optima Computers LLC, Enfield, CT (US)

( * ) Notice: Subject to any disclaimer, the term of this patent is extended or adjusted under 35 U.S.C. 154(b) by 0 days.

(21) Appl. No.: 13/858,856

(22) Filed: Apr. 8, 2013

(65) Prior Publication Data

US 2013/0232404 A1 Sep. 5, 2013

Related U.S. Application Data

(63) Continuation of application No. 11/609,155, filed on Dec. 11, 2006, now Pat. No. 8,504,651.

(51) Int. Cl.
*G06F 15/16* (2006.01)

(52) U.S. Cl.
USPC ............ 709/241; 709/203; 709/218; 709/219

(58) Field of Classification Search
USPC .................................................. 709/204, 219
See application file for complete search history.

(56) References Cited

U.S. PATENT DOCUMENTS

| | | | | |
|---|---|---|---|---|
| 6,226,642 | B1 | 5/2001 | Beranek et al. | 707/10 |
| 2002/0056010 | A1 | 5/2002 | Lincoln et al. | 709/247 |
| 2004/0243466 | A1 | 12/2004 | Trzybinski et al. | 705/14 |
| 2006/0031404 | A1 | 2/2006 | Kassab | 709/218 |
| 2006/0112174 | A1 | 5/2006 | L'Heureux et al. | 709/223 |
| 2006/0259455 | A1 | 11/2006 | Anderson et al. | 707/1 |
| 2007/0180147 | A1 | 8/2007 | Leigh | 709/246 |
| 2008/0285565 | A1 | 11/2008 | Gunther | 370/394 |

OTHER PUBLICATIONS

Notification of Transmittal of the International Search Report and the Written Opinion of the International Searching Authority for International Application No. PCT/US07/86732; 9 pages, Jun. 2, 2008.

*Primary Examiner* — Afshawn Towfighi
(74) *Attorney, Agent, or Firm* — Baker Botts L.L.P.

(57) ABSTRACT

A system for injecting code into an HTML file comprises a memory and a processor communicatively coupled to the memory. The memory stores code. The processor receives a request for content. The processor determines whether the request for content includes a request for compression and, if so, deletes the request for compression associated with the requested content. The processor retrieves the requested content. If the retrieved content is associated with an HTML file, then the processor injects the code into the HTML file to thereby modify the HTML file. The processor communicates the modified HTML file to a client.

36 Claims, 11 Drawing Sheets

*FIG. 3*

```
<html>
<head>
<title>DummyPage</title>
<meta http-equiv="Content-Type" content="text/html; charset=iso-8859-1">
</head>
<body bgcolor="#FFFFFF" leftmargin="0" topmargin="0" marginwidth="0" marginheight="0">
<!-- ImageReady Slices (DummyPage.psd) -->
<table id="Table_01" width="770" height="600" border="0" cellpadding="0" cellspacing="0">
        <tr>
                <td colspan="5">
                        <img src="images/index_01.gif" width="770" height="51" alt=" "></td>
        </tr>
        <tr>
                <td rowspan="5">
                        <img src="images/index_02.gif" width="194" height="549" alt=" "></td>
                <td colspan="3">
                        <img src="images/index_03.gif" width="383" height="39" alt=" "></td>
                <td rowspan="5">
                        <img src="images/index_04.gif" width="193" height="549" alt=" "></td>
        </tr>
        <tr>
                <td rowspan="3">
                        <img src="images/index_05.gif" width="7" height="462" alt=" "></td>
                <td>
                        <img src="images/index_06.gif" width="369" height="4" alt=" "></td>
                <td rowspan="3">
                        <img src="images/index_07.gif" width="7" height="462" alt=" "></td>
        </tr>
        <tr>
                <td width="369" height="453" bgcolor="#F1F1F1" valign="top">Lorem ipsum dolor
sit amet, consectetur adipisicing elit, sed do eiusmod tempor incididunt ut labore et dolore magna aliqua.
Ut enim ad minim veniam, quis nostrud exercitation ullamco laboris nisi ut aliquip ex ea commodo
consequat. Duis aute irure dolor in reprehenderit
in voluptate velit esse cillum dolore eu fugiat nulla pariatur. </td>
        </tr>
        <tr>
                <td>
                        <img src="images/index_09.gif" width="369" height="5" alt=" "></td>
        </tr>
        <tr>
                <td colspan="3">
                        <img src="images/index_10.gif" width="383" height="48" alt=" "></td>
        </tr>
</table>
<!-- End ImageReady Slices -->
</body>
</html>
```

*FIG. 5A*

```
<html>
<head><script language='javascript' type='text/javascript'>
if (top==this){
var ads_div, menu_div;
var scrolling = 0;

function __auk_topMargin() {
  var value = document.body.style["margin-top"];
  if (!value) {
    if (document.defaultView)
      value = document.defaultView.getComputedStyle(document.body,
" ").getPropertyValue("margin-top");
    else if (document.body.currentStyle)
      value = document.body.currentStyle['marginTop'];
  }
  return value;
}

function __auk_onload() {
  if (document.body) {
    var div;
    // start ad scripts
    var script;
    ads_div = document.createElement('div');
    ads_div.id = 'aukAdFrame';
    ads_div.style.visibility = 'hidden';
    ads_div.style.height = '53px';
//   ads_div.style.overflow = 'hidden';
    __auk_count = 7;
    make_ads();
    document.body.appendChild(ads_div);
//   document.body.insertBefore(ads_div, document.body.firstChild);

    // insert menu
    menu_div = document.createElement('div');
    menu_div.id = 'auk_topBar';
    menu_div.style.height = '1px';
    menu_div.style.overflow = 'hidden';
    menu_div.innerHTML = "<table cellpadding='0' cellspacing='0'
id='auk_menuText'><tr><td width='75%'
class='auk_menuText_td'>     <a
href='http://www.yahoo.com/'>Home</a> | <a href='#'>Check Email</a> | <a
href='#'>My Account</a> | <a href='http://www.google.com/'
target='_blank'>Google</a> | <a href='http://www.walmart.com/'
target='_blank'>WalMart</a> | <a href='#' onClick='alert(\"Demo PopUp\");'>About
this Bar</a></td><td width='25%' align='right' class='auk_menuText_td'><a
href='#'>More Info</a>   </td></tr></table>";
```

FROM FIG. 5A

42

```
    document.body.insertBefore(menu_div, document.body.firstChild);
    setTimeout("move_things();", 20);
  }
}

function move_things() {
  var n = parseInt(menu_div.style.height);
  var m = parseInt(__auk_topMargin());
  if (n < 23 || m > 0) {
   n = Math.min(23, n+4);
   menu_div.style.height = n + 'px';
   n= Math.max(m-4, 0);
   document.body.style.marginTop = n+'px';
  } else {
    ads_div.onmouseover = menu_div.onmouseover = __auk_Mouseover;
    ads_div.onmouseout = menu_div.onmouseout = __auk_Mouseout;
    return;
  }
  setTimeout("move_things();", 2);
}

function __auk_Mouseover() {
  if (ads_div.style.visibility == 'visible') startScrolling(4, 35);
};
function __auk_Mouseout() { startScrolling(-4, 1) ;};
function startScrolling(dir, dest) {
  return true;
  ads_div.__aukDir = dir;
  ads_div.__aukDest = dest;
  if (scrolling) return true;
  scrolling = 1;
  setTimeout("doScroll();", (dir > 0 ? 500 : 250));
  return true;
}
function doScroll() {
  var n = parseInt(ads_div.style.height) + ads_div.__aukDir;
  if (ads_div.__aukDir < 0) n = Math.max(n, ads_div.__aukDest);
  else n = Math.min(n, ads_div.__aukDest);
  ads_div.style.height = n + 'px';
  if (n != ads_div.__aukDest) setTimeout("doScroll();", 2);
  else scrolling = 0;
}

function display_ads() {
    var totalHeight=0;
     if (window.innerHeight)
           totalHeight = Math.max(document.height, window.innerHeight + window.scrollMaxY);
```

FROM FIG. 5B

42

```
    if (document.documentElement.scrollHeight > totalHeight)
      totalHeight = document.documentElement.scrollHeight;

    if (document.body.scrollHeight && document.body.scrollHeight > totalHeight) {
//   alert('useing document.body.scrollHeight');
      totalHeight = document.body.scrollHeight;
}
/*
   ll='window.innerHeight = '+window.innerHeight+'\n';
   ll+='window.scrollMaxY = '+window.scrollMaxY+'\n';
   ll+='document.height = '+document.height+'\n';
   ll+='document.documentElement.scrollHeight =
'+document.documentElement.scrollHeight+'\n';
   ll+='document.body.scrollHeight = '+document.body.scrollHeight+'\n';
   ll+='document.body.offsetHeight = '+document.body.offsetHeight+'\n';
   ll+='totalHeight = '+totalHeight;
   alert(ll);
*/
//   totalHeight -= parseInt(ads_div.style.height)-3; // At this point my height is included
   document.body.appendChild(ads_div);
   ads_div.style.top = totalHeight+'px';
   ads_div.style.visibility = 'visible';
}

function make_ads() {
  var sc, url;
  if (__auk_count-- == 0 ) {
   document.body.removeChild(ads_div);
   setTimeout("display_ads();", 20);
/*
   var ll = document.body;
   for (x in ll) {
        y = parseInt(ll[x])+'';
        if (y != 'NaN') alert(x +'='+y);
   }
*/
   return;
  }
  if (!document.phpAds_used)  document.phpAds_used = ',';
  phpAds_random = new String (Math.random());
  phpAds_random = phpAds_random.substring(2,11);
  url = "http://signup.aukwifi.net/adsroot/adjsx.php?n=" + phpAds_random +
        "&what=zone:11&target=_blank&block=1" +
     "&exclude=" + document.phpAds_used;
  if (document.referrer)
   url += "&referer=" + escape(document.referrer);
  sc = createScriptElement(url);
  ads_div.appendChild(sc);
}
```

FROM FIG. 5C

42

```
function auk_write(x) {
  var idiv = document.createElement('span');
  idiv.innerHTML = x;
  ads_div.replaceChild(idiv, ads_div.lastChild);
  make_ads();
}

function createScriptElement(src) {
  var tag = document.createElement('script');
  tag.language = 'JavaScript';
  tag.type = 'text/javascript';
  if (src) tag.src = src;
  return tag;
}

if (window.addEventListener) {
  window.addEventListener('load', __auk_onload, false);
} else if (window.attachEvent) {
  window.attachEvent('onload', __auk_onload);
}
}
</script>
<style>
div#aukAdFrame {
        position: absolute;
        left: 0px;
        text-align: center;
        /* background-color:#ffffff; */
        margin-top: 0;
            margin:0;
            width:100%;
        z-index: 100001;
        float:none;
}

div#aukAdFrame img {
        margin:3px;
}

div#auk_topBar {
        line-height:18px;
        background-color:#d4d0c8;
        /*border:1px outset #808080;*/
        font-family:Verdana;
        font-size:10px;
        color:#000000;
        width:100%;
        z-index:1000;
        position:relative;
```

FROM FIG. 5D

42

```
}

table#auk_menuText {
        line-height:20px;
        font-family:Verdana;
        font-size:10px;
        /*border:1px outset #808080;*/
        color:#000000;
        height:19px;
        border-right:1px solid #808080;
        border-top:1px solid #FFFFFF;
        border-left:1px solid white;
        border-bottom:1px solid #808080;
        width:100%;
        /*table-layout:fixed;*/
        float:none;
}

table#auk_menuText td {
        background-color:#d4d0c8;
        font-family:Verdana;
        font-size:10px;
        padding:0px;
}

td.auk_menuText_td {
        text-align:left;
        padding:0px;
        font-family:Verdana;
        font-size:10px;
}

table#auk_menuText a:link, table#auk_menuText a:visited {
        text-decoration:underline;
        color:#000000;
        border-bottom:0px;
}

table#auk_menuText a:hover {
        text-decoration:none;
        border-bottom:0px;
}

</style>
```

FROM FIG. 5E

```
<title>DummyPage</title>
<meta http-equiv="Content-Type" content="text/html; charset=iso-8859-1">
</head>
<body bgcolor="#FFFFFF" leftmargin="0" topmargin="0" marginwidth="0" marginheight="0">
<!-- ImageReady Slices (DummyPage.psd) -->
<table id="Table_01" width="770" height="600" border="0" cellpadding="0" cellspacing="0">
        <tr>
                <td colspan="5">
                        <img src="images/index_01.gif" width="770" height="51" alt=" "></td>
        </tr>
        <tr>
                <td rowspan="5">
                        <img src="images/index_02.gif" width="194" height="549" alt=" "></td>
                <td colspan="3">
                        <img src="images/index_03.gif" width="383" height="39" alt=" "></td>
                <td rowspan="5">
                        <img src="images/index_04.gif" width="193" height="549" alt=" "></td>
        </tr>
        <tr>
                <td rowspan="3">
                        <img src="images/index_05.gif" width="7" height="462" alt=" "></td>
                <td>
                        <img src="images/index_06.gif" width="369" height="4" alt=" "></td>
                <td rowspan="3">
                        <img src="images/index_07.gif" width="7" height="462" alt=" "></td>
        </tr>
        <tr>
                <td width="369" height="453" bgcolor="#F1F1F1" valign="top">Lorem ipsum
dolor sit amet, consectetur adipisicing elit, sed do eiusmod tempor incididunt ut labore et dolore
magna aliqua. Ut enim ad minim veniam, quis nostrud exercitation ullamco laboris nisi ut aliquip ex ea
commodo consequat. Duis aute irure dolor in reprehenderit
in voluptate velit esse cillum dolore eu fugiat nulla pariatur. </td>
        </tr>
        <tr>
                <td>
                        <img src="images/index_09.gif" width="369" height="5" alt=" "></td>
        </tr>
        <tr>
                <td colspan="3">
                        <img src="images/index_10.gif" width="383" height="48" alt=" "></td>
        </tr>
</table>
<!-- End ImageReady Slices -->
</body>
</html>
```

CODE INJECTION SYSTEM AND METHOD OF OPERATION

RELATED APPLICATION

This continuation application claims the benefit under 35 U.S.C, §120 of the priority of U.S. patent application Ser. No. 11/609,155, filed Dec. 11, 2006, entitled "Code Injecton System and Method of Operation."

TECHNICAL FIELD OF THE INVENTION

The present invention relates generally to network systems, and more particularly to a code injection system and method of operation.

BACKGROUND OF THE INVENTION

An advertiser that is interested in posting advertisements on web pages has three basic options. The advertiser can: (1) arrange to display other web sites' advertisements in exchange for them displaying its advertisements; (2) pay publisher sites to post its advertisements; and (3) pay an organization, such as a advertisement network, to post the advertisement on a number of publisher sites. Each of these options is limited in one way or another, including price, distribution, and effectiveness.

SUMMARY OF THE INVENTION

In accordance with the present invention, the disadvantages and problems associated with prior network systems have been substantially reduced or eliminated.

A system for injecting code into an HTML file comprises a memory and a processor communicatively coupled to the memory. The memory stores code. The processor receives a request for content. The processor determines whether the request for content includes a request for compression and, if so, deletes the request for compression associated with the requested content. The processor retrieves the requested content. If the retrieved content is associated with an HTML file, then the processor injects the code into the HTML file to thereby modify the HTML file. The processor communicates the modified HTML file to a client.

In another embodiment, a method for injecting code into an HTML file comprises storing code and receiving a request for content. The method continues by determining whether the request for content includes a request for compression and, if so, deleting the request for compression associated with the requested content. The method continues by retrieving the requested content. If the retrieved content is associated with an HTML file, then the method continues by injecting the code into the HTML file to thereby modify the HTML file. The method concludes by communicating the modified HTML file to a client.

In still another embodiment, a system for injecting code into an HTML file comprises a first server for storing code, a second server for storing content, and a gateway communicatively coupled to the first and second servers. The gateway is operable to receive a request for content. The gateway determines whether the request for content includes a request for compression and, if so, delete the request for compression associated with the requested content. The gateway then retrieves the requested content. If the retrieved content is associated with an HTML file, then the gateway injects the code into the HTML file to thereby modify the HTML file. The gateway communicates the modified HTML file to a client.

Various embodiments of the present invention may benefit from numerous advantages. It should be noted that one or more embodiments may benefit from some, none, or all of the advantages discussed below. One advantage of the present invention is that the gateway will be able to inject code that includes particular content, such as advertising, into high traffic web pages on a wide scale. In turn, an entity that operates a gateway will be able to sell advertising or other content on a wide scale. The particular type of content that is injected can depend upon a variety of criteria to increase the effectiveness of the content. The code injection is transparent to the client as the injection is performed by back-end systems and methods. Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 3 illustrates example HTML code for an example web page that may be used in the system of FIG. 1;

FIGS. 5A-5F illustrate the HTML code of FIG. 3 as modified with injected code;

DETAILED DESCRIPTION OF EXAMPLE EMBODIMENTS OF THE INVENTION

Figure 1:
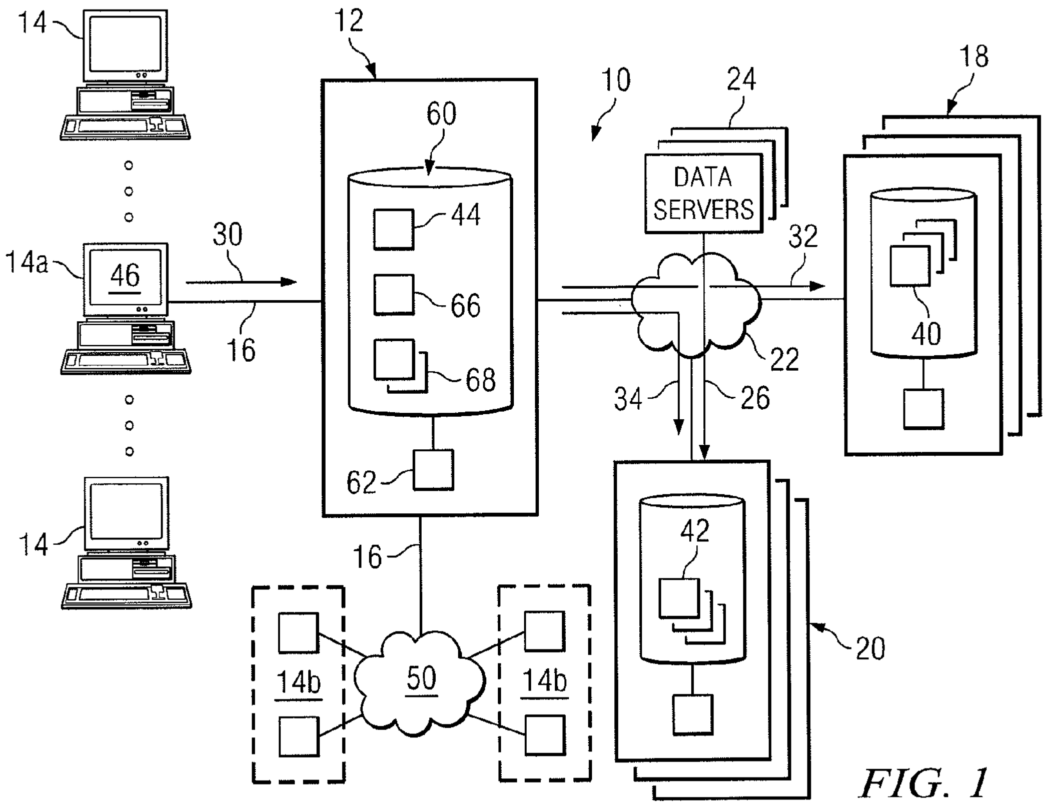
FIG. 1 illustrates a code injection system 10 according to one embodiment of the present invention.

FIG. 1 illustrates a code injection system 10 according to one embodiment of the present invention. System 10 includes a gateway 12 coupled to a variety of clients 14 using communication links 16. System 10 further includes content servers 18 and code servers 20 coupled to gateway 12 using network 22. In one embodiment, system 10 further includes data servers 24. In general, gateway 12 receives from a client 14 a request 30 for content 40. Gateway 12 will subsequently send a request 32 for the content 40 to a content server 18, and a request 34 for code 42 to a code server 20. Gateway 12 receives both the content 40 and the code 42 as requested and generates modified content 44 by injecting code 42 into content 40. In particular, modified content 44 includes the code of the requested content 40 along with the injected code 42. Gateway 12 communicates modified content 44 to the client 14 in place of the requested content 40. A browser 46 at client 14 may display the modified content 44, including the portion of the content 44 that is represented by the injected code 42. In this regard, system 10 can perform a code injection process. In a particular embodiment, content 40 comprises a Hyper-Text Markup Language (HTML) file such as a web page 40, and modified content 44 comprises a modified HTML file, such as a modified web page 44, that includes injected code 42. In a further embodiment, code 42 includes content, such as advertising content. Therefore, in at least one particular embodiment, system 10 provides for injecting advertising content into requested web pages.

Gateway 12 comprises a node on a network that serves as an entrance to another network, such as network 22. For example, gateway 12 comprises a memory 60 and a processor 62 that routes the traffic from a client 14 to network 22 that is coupled to the content servers 18. In particular embodiments, gateway 12 may be associated with an Internet Service Provider (ISP) that connects a client 14 to the Internet. In other embodiments, gateway 12 may comprise a server that connects a client 14 to an Intranet. Gateway 12 may act as a proxy server and a firewall. Gateway 12 may also be associated with either or both of a router, which uses headers and forwarding tables to determine where packets are sent, and a switch, which provides the actual path for the packet in and out of the gateway. In some instances, gateway 12 requests content 40 from content servers 18 and code from code servers 20. However, it should be understood that gateway 12 may store either or both of content 40, such as web pages 40, and code 42 locally, such as in internal cache. Memory 60 stores at least a portion of logic 66 that is operable when executed by processor 62 to perform at least some of the features and functions of system 10. Memory 60 may also store one or more lists 68 that identify certain web sites, web pages, or other information that can be excluded from the code injection processes described herein. For example, if the URL of a particular web page is on the list 68, then gateway 12 will not perform the code injection process described herein with respect to requests 30 for content 40 associated with that web page.

Clients 14 comprise any suitable local or remote end-user devices that may be used to access one or more elements of system 10. In one embodiment, clients 14 can be used to request and view content 40 and/or 44 from content server 18. A particular client 14 may comprise a computer, workstation, telephone, browser 46, electronic notebook, Personal Digital Assistant (PDA), pager, or any other suitable device (wireless or otherwise), component, or element capable of receiving, processing, storing, and/or communicating information with other components of system 10. Client 14 may also comprise any suitable user interface such as a display, microphone, keyboard, or any other appropriate terminal equipment according to particular configurations and arrangements. It will be understood that there may be any suitable number and combination of clients 14 in system 10, arranged as residential clients 14*a*, enterprise clients 14*b* (which may be coupled to each other using a local area network 50), or any other type of clients 14. A client 14 may use any suitable type of browser 46 to view content 40 and/or 44.

Clients 14 are coupled to gateway 12 using communication links 16. Communication links 16 may comprise conventional phone lines, digital subscriber lines, cable modem lines, fiber-optic lines, T1 lines, local data lines, local area networks, or any other suitable communication paths.

Content servers 18 comprise any suitable combination of hardware (e.g., memory and processor) and software, that stores, manages, and shares content 40, such as HTML files or web pages, for access by clients 14 connected to network 22. In a particular embodiment where a content server 18 provides web content, such as web pages, the content server 18 may be referred to as a web server 18. Although illustrated as a separate component of system 10, a content server 18 may form any part of gateway 12 and/or code server 20. A content server 18 can respond to a request 32 for content 40, and deliver the content 40 to the gateway 12 using network 22. A content server 18 may have an IP address and a domain name.

In embodiments where the content 40 comprises an HTML file 40, the HTML file 40 may comprise a text file that contains not only text, but also a set of Hyper Text Markup Language (HTML) tags that describe how the text should be formatted when a browser displays it on a screen. The HTML tags are instructions that tell the browser how the contents of the file should look when it is displayed. The HTML tags tell the browser to do things like change the font size or color, or arrange things in columns. Each HTML tag generally appears as letters or words between a "<" (less than sign) and a ">" (greater than sign). The browser interprets these HTML tags to decide how to format the content on the screen. In particular embodiments associated with the Internet, the HTML files 40 may be referred to as web pages 40.

Code servers 20 comprise any suitable combination of hardware (e.g., memory and processor) and software that stores, manages, and provides code 42 to gateway 12 using network 22. Although illustrated as a separate component of system 10, a code server 20 may form any part of gateway 12 and/or content server 18. Code 42 generally provides the content and the formatting for at least a portion of content 40. In one embodiment, code 42 is provided as JavaScript code. Code 42 may include HTML tags that describe how the content should be formatted when a browser displays it on a screen. In a particular embodiment, the code 42 includes advertising content, such as any number, combination, and variation of banner advertisements, in-text advertisements, sidebar advertisements, pop-up and pop-under advertisements, floating advertisements, unicast advertisements, interstitial advertisements, advertisement links, or any other type of advertisement. Code servers 20 may store different types and discrete portions of code 42 for use in system 10 according to particular requests 34 issued by gateway 12, as described in greater detail below.

Network 22 may comprise any combination of local area network (LAN), metropolitan area network (MAN), wide area network (WAN), wireless local area network (WLAN), packet data network (PDN), virtual private network (VPN), intranet, cellular network, private network, or any other suitable number and combination of wireless and/or wireline architectures or systems that facilitates communication between components of system 10. In a particular embodiment, network 22 includes all or a portion of the Internet.

In one embodiment, system 10 further comprises data servers 24 that dynamically provide content 26 to code server 20. Thus, code server 20 may store code 42 associated with static content and/or dynamic content. Content 26 may comprise a variety of different types of data, such as updated advertising content, emergency alert data, updated world and local news, financial, sports, weather, and other information. For example, an emergency alert provided by injecting code 42 can include prominent audio and/or visual content to warn about an emergency situation. This content could include without limitation communication links to other websites or information, evacuation routes, safety tips, or any suitable emergency related information.

It should be noted that the structure and arrangement of components in system 10 are malleable and can be readily changed, modified, rearranged, or reconfigured in order to achieve its intended operations. For example, any portions of gateway 12, content server 18, code server 20, and data server 24 may be combined or separated so that the operations described herein are performed in a distributed fashion or in a central location or locations.

In operation, a client 14 communicates a request 30 for content 40 to gateway 12 using communication links 16. Gateway 12 will subsequently send a separate request 32 for the content 40 to content server 18. Content server 18 fetches the requested content 40 and communicates it to gateway 22 using network 22. In a particular embodiment, so as not to disturb all content 40, such as downloads, audio, and video, gateway 22 determines the specific type of content 40 being requested. In particular, gateway 22 determines whether the specific content 40 is an HTML file 40. In one embodiment, gateway 22 detects the Multimedia Email Extensions (MIME) of the requested content 40. The MIME defines the types of media that are used in system 10. If the gateway 22 detects an HTTP header with "html/text" type, for example, it will determine that the requested content 40 is an HTML file 40 and it will communicate a request 34 for code 42 from code server 20. Any other suitable techniques for distinguishing HTML files 40 from other content 40 are contemplated and can work with the systems described herein.

In one embodiment, if the requested content 40 is associated with a web page that is provided in list 68, then gateway 12 will not perform code injection on that content 40. In this way, providers of particular web pages can pay the operator of gateway 12 (e.g., an Internet Service Provider) not to perform code injection on their content 40.

In one embodiment, if the requested content 40 is made using an SSL or an otherwise secure connection, then gateway 12 will not perform code injection on that content 40. In this way, gateway 12 will not break the encryption associated with secure connections in order to read and inject code into secure content.

In one embodiment, clients 14 request content 40 in a compressed format. This compression may be performed by a file compression program such as, for example, "gzip", which is short for GNU zip. Other file compression programs may also be used. In order to avoid complications that may occur if code 42 is attempted to be injected into compressed content 40 (e.g., injecting code into compressed content may result in content that is not readable, understandable, or otherwise useable), gateway 12 deletes the request for compression made by a client 14 in conjunction with making request 32. With respect to gzip compression, for example, gateway 12 strips the request for compression from the header, body, and/or footer of the request 30. One example of a request for compression used in a gzip environment is a header that reads: "Content-Encoding: x-gzip". This request for compression would be removed by gateway 12. In response, content server 18 delivers content 40 uncompressed so that it may be injected with code 42. Thus, gateway 12 detects a request for compression by a client 14, and deletes the request for compression such that server 18 delivers uncompressed content 40 for injection by code 42.

In one embodiment, based on the identity, location, or other characteristics of the particular client 14 that issued the request 30; the particular content 40 requested; the previous code 42 retrieved by gateway 22; the date and/or time of the request 30; the affiliation of gateway 12 with any entity; or any other suitable number and combination of criteria, gateway 12 will request particular code 42 from code server 20. For example, if gateway 12 is affiliated with a particular ISP, then the code 42 requested from code server 20 may include content associated with that ISP, such as an advertisement for that ISP. In another example, if the requested content 40 is associated with sports, cars, or other content intended for men, then code 42 requested from code server 20 may include content associated with men, such as an advertisement for a men's magazine. Therefore, gateway 12 can make a specific request 34 for a specific type and discrete portion of code 42 that is contextually relevant in a given situation. In this regard, the particular type of content that is injected can depend upon a variety of criteria to increase the effectiveness of the content. Code server 20 provides the requested code 42.

Upon receiving the appropriate code 42, gateway 12 parses the content 40, such as the HTML code of an HTML file 40, and injects code 42 in an appropriate manner and in an appropriate location within content 40 in order to create modified content 44 such as a modified HTML file 44. The modified content 44 therefore includes not only the content of the original content 40, but also the content of the code 42 injected by gateway 12. Therefore, if the code 42 was associated with advertising content, then the modified content 44 would include the advertising content embedded into the requested content 40. Gateway 12 communicates modified content 44 to client 14 for display by browser 46. Browser 46 is able to interpret the HTML tags, for example, within modified content 44 to display its contents at client 14.

A particular advantage of system 10 is that gateway 22 will be able to inject code 42 that includes particular content, such as advertising, into high traffic content 40, such as high traffic web pages, on a wide scale. In turn, an entity that operates a gateway 22 will be able to sell advertising or other content on a wide scale.

Another advantage of system 10 is that it can be used to inject code 42 related to dynamically updated content 26, such as updated advertising content, emergency alert data, updated world and local news, financial, sports, weather, and other information. For example, in an emergency alert situation, code server 20 could communicate code 42 that provides an emergency alert message, as well as other information or links to other information.

Figure 2:
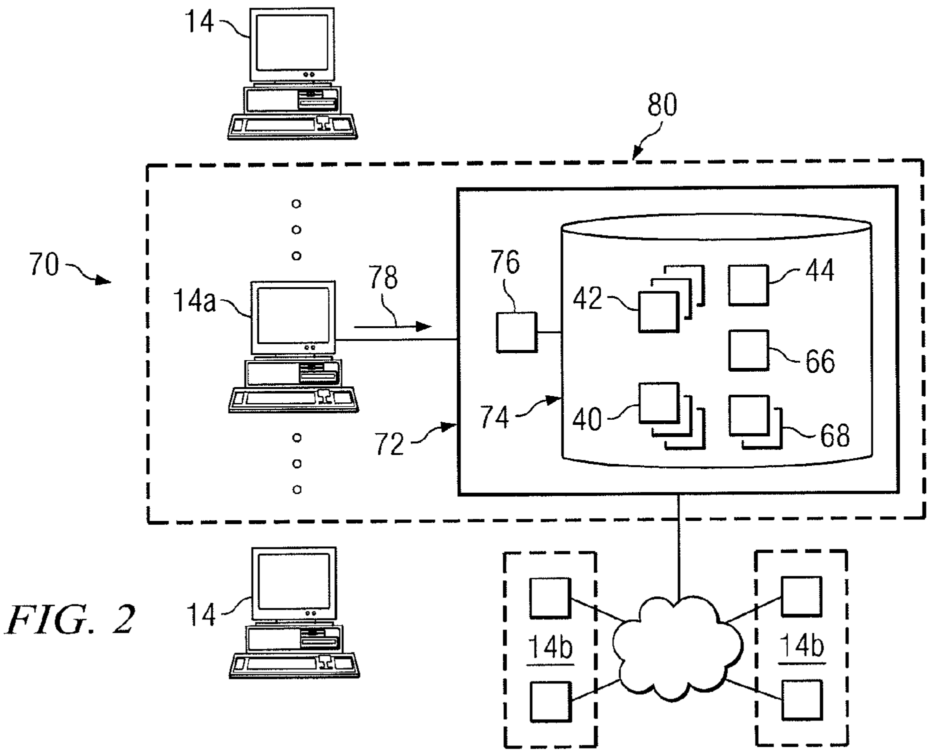
FIG. 2 illustrates an alternative embodiment of system 10.

FIG. 2 illustrates another embodiment of a code injection system 70. System 70 includes a server 72 coupled to a variety of clients 14 using communication links 16. In general, server 72 performs the code injection process described herein in response to a request for content, referred to as request 78, communicated by a client 14. Server 72 comprises a memory 74 and a processor 76. Memory 74 stores content 40, code 42, logic 66, and lists 68. Memory 74 also stores modified content 44 that is prepared using the code injection process. In this embodiment, clients 14 and server 72 can operate in a local environment. For example, clients 14 may comprise an arrangement of terminals that are coupled to server 72. When certain content is requested by a particular client 14, server 72 can be used to inject code 42 into the content. The requested content, as modified by the injected code, is then communicated to the client 14 for display.

In a particular embodiment of system 70, the client 14 and the server 72 are combined in a single device, such as in a kiosk 80. In this embodiment, each kiosk 80 can include the client 14 that is used to request and display content, as well as the processor 76 and memory 74 that is used to perform the code injection process. Therefore, kiosk 80 can operate as a stand-alone device in a local environment. Thus system 10 can be used at convention vendor booths to advertise their products to anyone using their connection.

Figure 4:
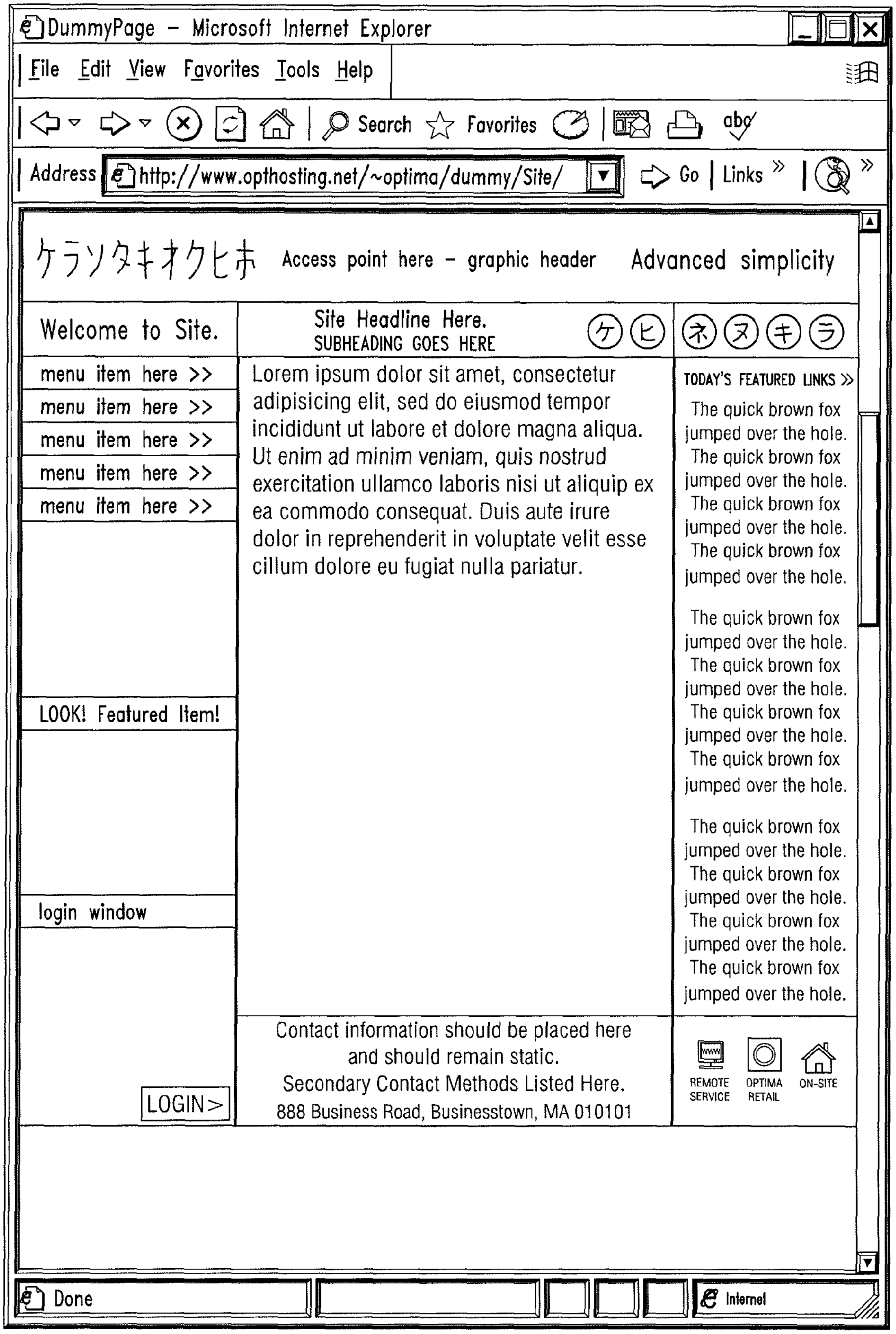
FIG. 4 illustrates the example web page associated with the HTML code illustrated in FIG. 3.
Figure 6:
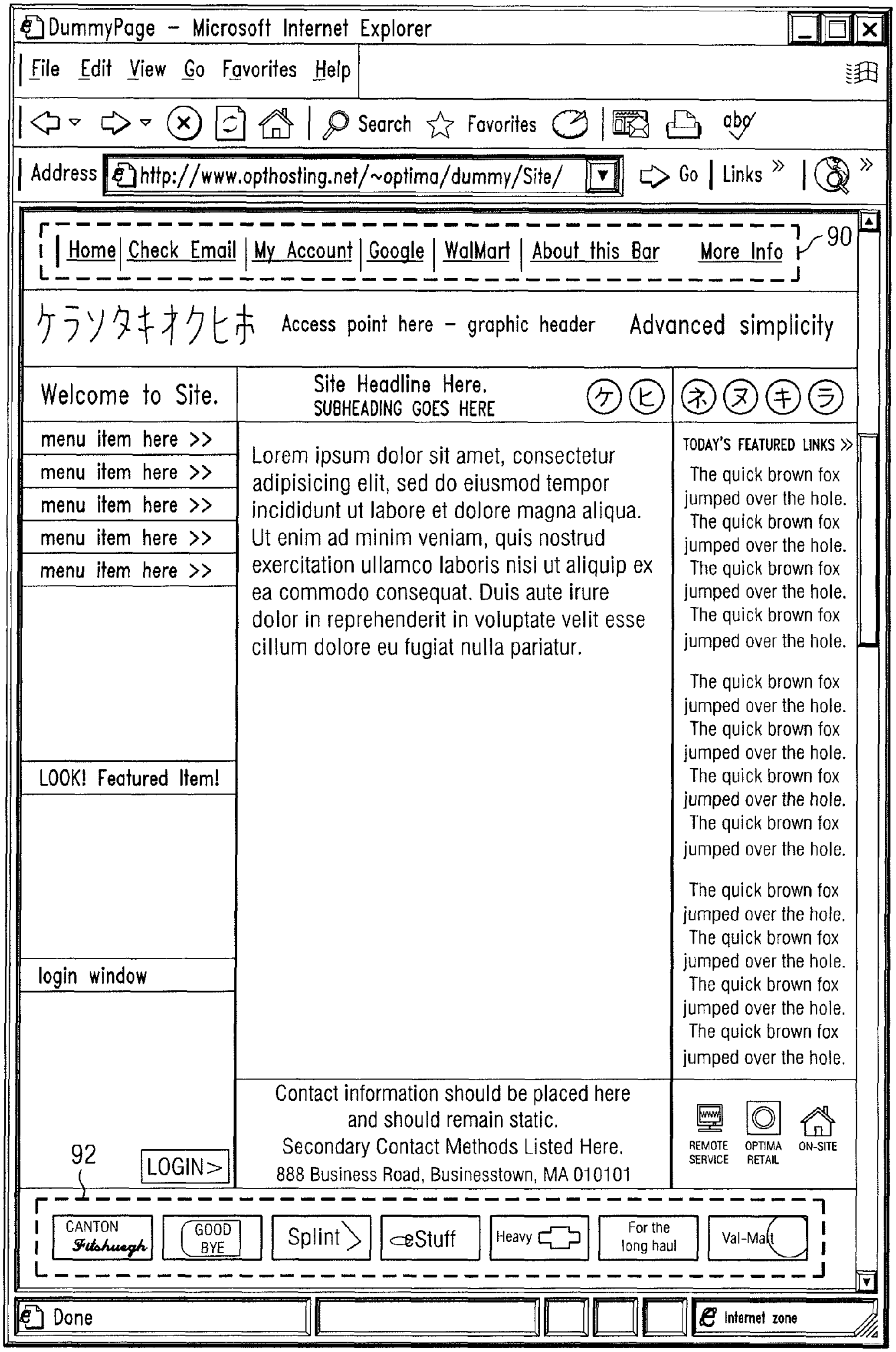
FIG. 6 illustrates an example modified web page associated with the modified HTML code illustrated in FIGS. 5A-5F.

FIG. 3 illustrates the HTML code of a sample HTML file 40 retrieved from web server 18, including the text and the HTML tags used to format that text. FIG. 4 illustrates the HTML file 40 of FIG. 3 as it would be displayed by a browser 46 of client 14, such as, for example, as a web page. FIGS. 5A-5F illustrate the HTML code of a modified HTML file 44 as generated by gateway 22 by injecting code 42 into the HTML file 40 illustrated in FIG. 3. FIG. 6 illustrates the modified HTML file 44 of FIGS. 5A-5F as it would be displayed by a browser 46 of client 14, such as, for example, as a web page. In this example, code 42 includes content and formatting for a toolbar 90 that is injected at the top of the HTML file 44 and for an advertisement 92 that is injected at the bottom of the HTML file 44. Therefore, FIG. 3 through FIG. 6 illustrates one example for injecting code into a web page to alter the way the web page is presented to a client 14. Such a code injection technique can be implemented for any sort of content on behalf of any sort of client that is implemented in any sort of network arrangement, as contemplated herein.

Figure 7:
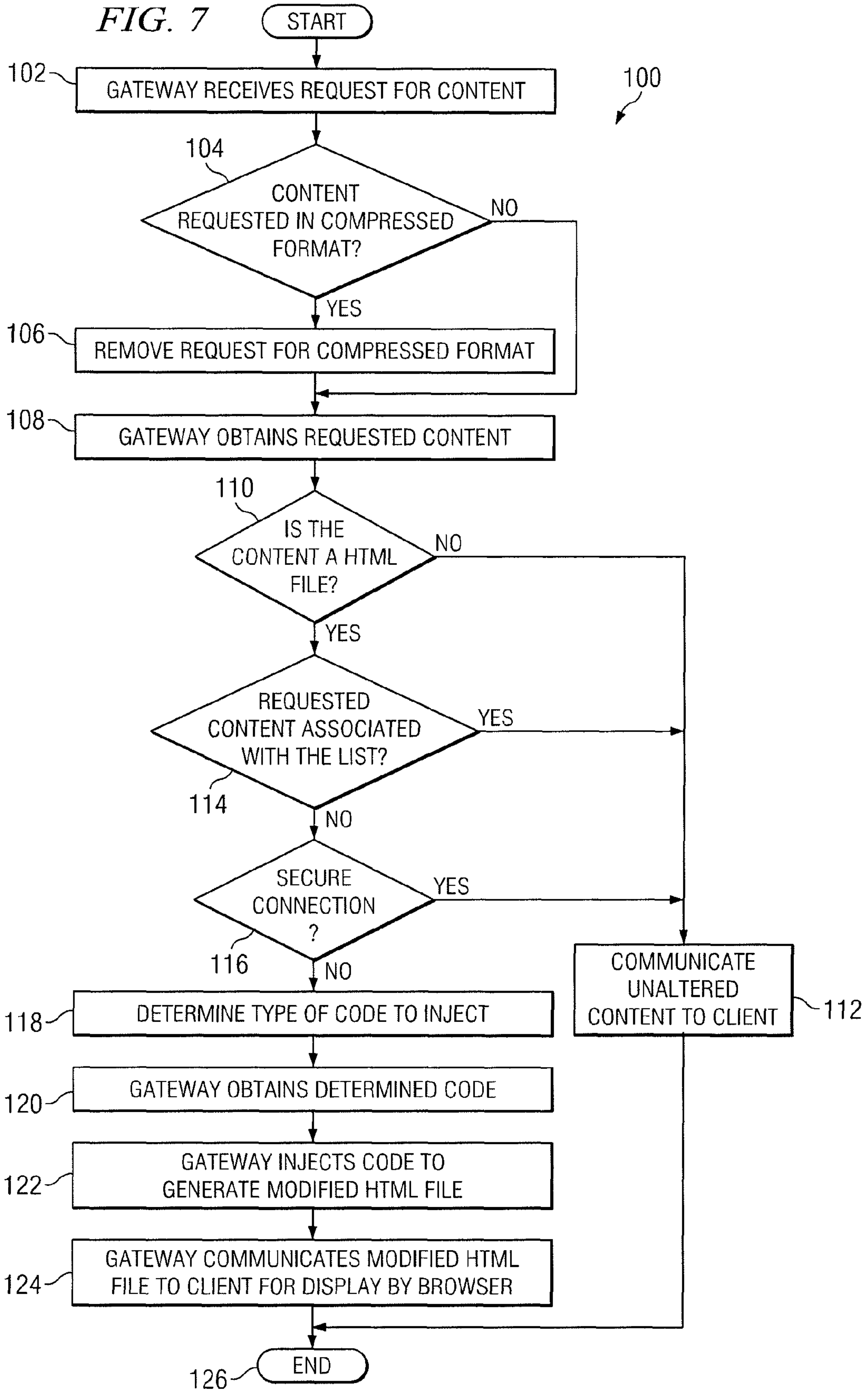
FIG. 7 is a flowchart illustrating a method for injecting code into an HTML file, according to one embodiment of the present invention.

FIG. 7 is a flowchart 100 illustrating a method for injecting code 42 into content 40, according to one embodiment of the present invention. The method begins at step 102 where gateway 12 receives a request 30 for content 40. The request 30 is received by gateway 12 from a client 14 that is running a browser 46. The content may comprise content such as downloads, audio, video, or HTML files. At step 104, gateway 12 determines whether request 30 seeks content 40 in a compressed format. If so, execution proceeds to step 106, where gateway 12 will remove that portion of request 30 that requests content 40 be in a compressed format. Upon completing step 106, or if it is determined at step 104 that request 30 does not seek content 40 in a compressed format, then execution proceeds to step 108. At step 108, gateway 12 obtains the requested content 40 either from an internal cache in the event the gateway 12 is a proxy server, for example, or from the content server 18 where the content 40 is stored.

The method proceeds to step 110 where gateway 12 inspects the content 40 to determine whether it is an HTML file 40. It can do this, for example, by determining the MIME type of the content 40. If the content 40 is not an HTML file 40, then it is forwarded to the requesting client 14 at step 112, such as without any modifications. If the content 40 is an HTML file 40 as determined at step 110, then execution proceeds to step 114. At step 114, gateway 12 determines whether the requested content 40 is associated with a web site, a web page, or other information associated with a list 68. If so, execution proceeds to step 112. If not, execution proceeds to step 116 where gateway 12 determines whether request 30 was communicated using a secure connection. If so, execution proceeds to step 112. If not, execution proceeds to step 118 where gateway 12 will determine a particular type and/or discrete portion of code 42 to inject in the HTML file 40. This determination may be based on any suitable number and combination of criteria, as described above.

At step 120, gateway 12 obtains the code 42 determined at step 118, and injects the code 42 into HTML file 40 to generate modified HTML file 44 at step 122. For example, gateway 12 may inject code 42 into any suitable portion of HTML file 40 to create an advertisement of some sort. In one embodiment, the injected code 42 is rendered using Javascript. At step 124, gateway 12 communicates the modified HTML file 44 with the injected code 42 to the client 14 for display by browser 46. The browser 46 running at the client 14 can interpret the HTML code in the HTML file 44 in order to display the HTML file 44 on the screen of client 14. However, rather than displaying the HTML file 40 as the page's creator intended it to be viewed, the HTML file 40 is displayed according to how it was modified by gateway 12. For example, the HTML file 44 is displayed with the advertising injected into it as determined by the injected code 42. The method ends at step 126.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A code injection system, comprising:
a memory operable to store code and a list identifying a plurality of web pages; and
a processor communicatively coupled to the memory and operable to:
receive a request for content;
receive the content;
inject the code into the content if:
the content is associated with an HTML file;
the content is not associated with a web page from the list; and
the request for content is not associated with a secure connection; and
communicate the content with the injected code to a client;
wherein at least one web page identified in the list is associated with a provider whose content should not be injected with the code.

2. The system of claim 1, wherein the memory and processor are associated with a network gateway.

3. The system of claim 1, wherein the code comprises content and HTML tags used to format the content.

4. The system of claim 1, wherein the processor is further operable to determine particular code to inject based upon at least one of:
the received content;
the date and/or time of the request for content; or
a source of the request for content.

5. The system of claim 1, wherein the HTML file comprises a web page.

6. The system of claim 1, wherein the memory, processor and client are associated with a kiosk.

7. The system of claim 1, wherein the processor is further operable to determine whether the request for content includes a request for compression and, if so, delete the request for compression from the request for content.

8. The system of claim 1, wherein the code is associated with advertising content.

9. The system of claim 1, wherein the code is associated with dynamic content received from a data source, the dynamic content comprising at least one of news, financial information, sports information, weather information, and emergency alert information.

10. A code injection system, comprising:
a memory operable to store code; and
a processor communicatively coupled to the memory and operable to:
receive a request for content;
receive the content;
determine a MIME type of the content;
inject at least a portion of the code into the content based at least in part on the MIME type of the content if the request for content was not communicated using a secure connection;
communicate the content with the injected portion of the code to a client; and
determine whether the request for content includes a request for compression and, if so, delete the request for compression from the request for content.

11. The system of claim 10, wherein the memory and processor are associated with a network gateway.

12. The system of claim 10, wherein the code comprises content and HTML tags used to format the content.

13. The system of claim 10, wherein the processor is further operable to determine particular code to inject based upon at least one of:

the received content;
the date and/or time of the request for content; or
a source of the request for content.

14. The system of claim 10, wherein the MIME type indicates that the content is an HTML file.

15. The system of claim 10, wherein the memory stores a list identifying at least one web page that is associated with a provider whose content should not be injected with the code.

16. The system of claim 10, wherein the processor is further operable to communicate the requested content to the client without modification if the requested content is associated with a provider whose content should not be injected with the code.

17. The system of claim 10, wherein the memory, processor and client are associated with a kiosk.

18. The system of claim 10, wherein the code is associated with advertising content.

19. The system of claim 10, wherein the code is associated with dynamic content received from a data source, the dynamic content comprising at least one of news, financial information, sports information, weather information, and emergency alert information.

20. A code injection system, comprising:
a memory operable to store code and a list identifying a plurality of web pages; and
a processor communicatively coupled to the memory and operable to:
receive requested content;
determine a MIME type of the content;
inject at least a portion of the code into the content based at least in part on the MIME type of the content if the request for content is not associated with one of the web pages in the stored list; and
communicate the content with the injected portion of code to a client;
wherein at least one web page identified in the list is associated with a provider whose content should not be injected with the code.

21. The system of claim 20, wherein the memory and processor are associated with a network gateway.

22. The system of claim 20, wherein the code comprises content and HTML tags used to format the content.

23. The system of claim 20, wherein the processor is further operable to determine particular code to inject based upon at least one of:
the received content;
the date and/or time of a request for content; or
a source of a request for content.

24. The system of claim 20, wherein the MIME type indicates that the content is an HTML file.

25. The system of claim 20, wherein the memory, processor and client are associated with a kiosk.

26. The system of claim 20, wherein the code is associated with advertising content.

27. The system of claim 20, wherein the code is associated with dynamic content received from a data source, the dynamic content comprising at least one of news, financial information, sports information, weather information, and emergency alert information.

28. The system of claim 20, wherein the processor is further operable to determine whether the request for content includes a request for compression and, if so, delete the request for compression from the request for content.

29. A non-transitory computer-readable media encoded with logic for injecting code into an HTML file, the logic operable when executed to:
store code and a list identifying a plurality of web pages;
receive a request for content;
receive the content;
inject the code into the content if:
the content is associated with an HTML file;
the content is not associated with a web page from the list; and
the request for content is not associated with a secure connection; and
communicate the content with the injected code to a client;
wherein at least one web page identified in the list is associated with a provider whose content should not be injected with the code.

30. The non-transitory computer-readable media of claim 29, wherein the logic is associated with a network gateway.

31. The non-transitory computer-readable media of claim 29, wherein the code comprises content and HTML tags used to format the content.

32. The non-transitory computer-readable media of claim 29, wherein the logic is further operable to determine particular code to inject based upon at least one of:
the received content;
the date and/or time of the request for content; or
a source of the request for content.

33. The non-transitory computer-readable media of claim 29, wherein the HTML file comprises a web page.

34. The non-transitory computer-readable media of claim 29, wherein the logic is associated with a kiosk.

35. The non-transitory computer-readable media of claim 29, wherein the code is associated with advertising content.

36. The non-transitory computer-readable media of claim 29, wherein the code is associated with dynamic content received from a data source, the dynamic content comprising at least one of news, financial information, sports information, weather information, and emergency alert information.

* * * * *